US006801320B2

(12) United States Patent
Szafraniec (10) Patent No.: US 6,801,320 B2
(45) Date of Patent: Oct. 5, 2004

(54) METHOD AND APPARATUS FOR A JONES VECTOR BASED HETERODYNE OPTICAL POLARIMETER

(75) Inventor: Bogdan Szafraniec, Sunnyvale, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 110 days.

(21) Appl. No.: 10/271,048

(22) Filed: Oct. 15, 2002

(65) Prior Publication Data

US 2004/0070766 A1 Apr. 15, 2004

(51) Int. Cl.[7] ............................................. G01B 9/02
(52) U.S. Cl. ................................... 356/484; 356/477
(58) Field of Search ................................. 356/477, 484

(56) References Cited

U.S. PATENT DOCUMENTS 6,671,056 B2 * 12/2003 Szafraniec .................. 356/484

OTHER PUBLICATIONS

Heismann, Fred et al., "Automatic Compensation of First-Order Polarization Mode Dispension in a 10Gb/s Transmission System", ECEC 98, Sep. 20–24, 1998, Madrid, Spain, pp. 529–530.
Sunnerud, Henrik et al., "A Comparison Between Different PMD Compensation Techniques", Journal of Lightwave Technology, vol. 20, No. 3, Mar. 2002, pp. 368–378.

Poti, Luca et al., "Experimental Demonstration of a PMD Compensator with a Step Control Algorithm", IEEE Photonics Technology Letters, vol. 13, No. 12, Dec. 2001, pp. 1367–1369.
Song, Shuxian et al., "A Poincare Sphere Method for Measuring Polarization–Mode Dispersion Using Four–Wave Mixing (FWM) in Single–Model Optical Fiber", pp. 79–82.
Calvani, Riccardo et al., "Real–Time Heterodyne Fiber Polarimetry with Narrow– and Broad–Band Sources", Journal of Lightwave Technology, vol. LT–$, No. 7, Jul. 1986, pp. 877–883.
Roudas, I. et al., "Coherent Heterodyne Frequency–Selective Polarimeter for Error Signal Generation in HigherOrder PMD Compensation", Wednesday Afternoon, OFC 2002, pp. 299–301.
Baney, Douglas M. et al., "Coherent Optical Spectrum Analyzer", IEEE Photonics Technology Letters, vol. 14, No. 3, Mar. 2002, pp. 355–357.
Abbas, Gregory L., et al., "A Dual–Detector Optical Heterodyne Receiver for Local Oscillator Noise Suppression", Journal of Lightwave Technology, vol. LT–#, No. 5, Oct. 1985, pp. 1110–1122.

* cited by examiner

Primary Examiner—Frank G. Font
Assistant Examiner—Patrick Connolly
(74) Attorney, Agent, or Firm—Juergen Krause-Polstorff (57) ABSTRACT

A heterodyne polarimeter is disclosed where a polarization state is measured by using a polarization diversity receiver employing a polarization beam splitter to output two heterodyne signals. The amplitude and relative phase of the two detected heterodyne signals uniquely determine the polarization state.

20 Claims, 13 Drawing Sheets

METHOD AND APPARATUS FOR A JONES VECTOR BASED HETERODYNE OPTICAL POLARIMETER

CROSS-REFERENCE TO RELATED APPLICATIONS

This application relates to the copending application Ser. No. 10/271132 (Attorney Reference No: 10020448), filed on the same day, entitled "System and Method for PMD Measurement from Coherent Spectral Analysis" by Szafraniec and Baney owned by the assignee of this application and incorporated herein by reference.

BACKGROUND OF THE INVENTION

Typically, optical polarization state measurement methods are based on measurements of the individual Stokes vector components, i.e., measurements of the optical power transmitted through 0° linear, 45° linear and circular polarizers. The analogous technique has been proposed in the heterodyne architecture by I. Roudas et al. in "Coherent heterodyne frequency-selective polarimeter for error signal generation in higher-order PMD compensators," OFC 2002, pp. 299–301, where the polarization state of the local oscillator is sequentially switched between 0° linear, 45° linear and circular polarization states to provide heterodyne measurements of the signal amplitude in the selectable polarization states. The polarization switching that is required slows down the polarization measurement process.

Another heterodyne technique determines the polarization state by determining the amplitude and relative phase of the two detected heterodyne signals. This technique has been used by K. Oka et al., "Evaluation of phase fluctuations of orthogonal optical eigen modes guided in an axially vibrating birefringent single-mode fiber", Journal of Lightwave Technology, Vol. 8, No. 10, 1482–1486, 1990 to determine fiber birefringence and by C. Chou et al., "Amplitude sensitive optical heterodyne and phase lock-in technique on small optical rotation angle detection of chiral liquid", Japanese Journal of Applied Physics, Part 1, Vol. 36, No. 1A, 356–359, 1997 to measure optical activity in chiral liquids at fixed optical frequencies. However, this heterodyne technique has not been used with swept local oscillator sources.

SUMMARY OF THE INVENTION

An optical heterodyne system is inherently sensitive to the polarization of the heterodyned signals. In accordance with the invention, a polarization state is measured by using a polarization diversity receiver employing a polarization beam splitter to output two heterodyne signals. The amplitude and relative phase of the two detected heterodyne signals uniquely determine the polarization state. However, a problem arises when the local oscillator (LO) is swept over a frequency range and not kept at a fixed frequency. The polarization state is no longer uniquely determined but jumps between the hemispheres of the Poincare sphere creating a polarization state ambiguity.

Modification of the detection method and apparatus in accordance with the invention eliminates the polarization state ambiguity arising from the two images that result from the mixing process thus allowing unambiguous determination of the polarization state.

DETAILED DESCRIPTION OF THE INVENTION

In accordance with the invention, two parameters of the Jones vector that relate easily to the Poincare sphere are directly measured using a heterodyne optical polarimeter to determine the polarization state of a signal. In the selected formalism, the Jones vector contains the two parameters α and ψ such that the Jones vector for the polarization state P is represented as:

$$P = \begin{pmatrix} \cos\alpha \\ e^{i\psi}\sin\alpha \end{pmatrix}. \quad (1)$$

Figure 1:
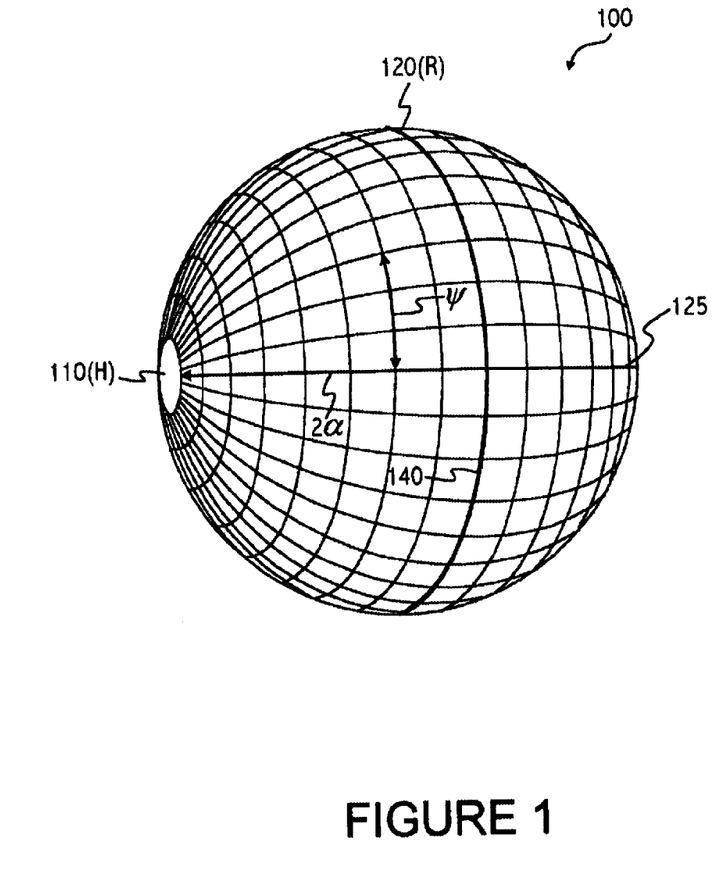
FIG. 1 shows grid lines that correspond to constant α and ψ on a Poincare sphere in accordance with the invention.

The angles α and ψ do not correspond to the two parameters, azimuth and ellipticity, typically used in connection with the Poincare sphere. FIG. 1 shows grid lines that correspond to constant α and ψ on Poincare sphere 100. The parameter α specifies a circle in the vertical plane. The parameter ψ specifies a locus on that circle which corresponds to a polarization state. The parameter ψ may be viewed as moving the polarization state on the circle so that the parameter ψ is the polarization state phase. Hence, control of the parameter ψ corresponds to control of the polarization phase with each vertical circle defined by the parameter α. With reference to FIG. 1, to determine the polarization state, P, described by Eq. (1) on Poincare sphere 100, the angle 2α is measured by moving counterclockwise along equator 125 from linear horizontal polarization state 110 as shown in FIG. 1. The angle ψ is measured by moving counterclockwise about the axis V-H where V (not shown) is the linear vertical polarization state on the opposite side of the Poincare sphere from H 110. For example, right circular polarization state 120 is located at a pole of Poincare sphere 100 as shown in FIG. 1 and is reached by moving $2\alpha=\pi/2$ along equator 125 from H 110 and then moving counter-clockwise $\psi=\pi/2$ about the axis V-H. Therefore, the Jones vector R for the right circular polarization state is:

$$R = \frac{1}{\sqrt{2}}\begin{pmatrix} 1 \\ i \end{pmatrix} \quad (2)$$

Figure 2:
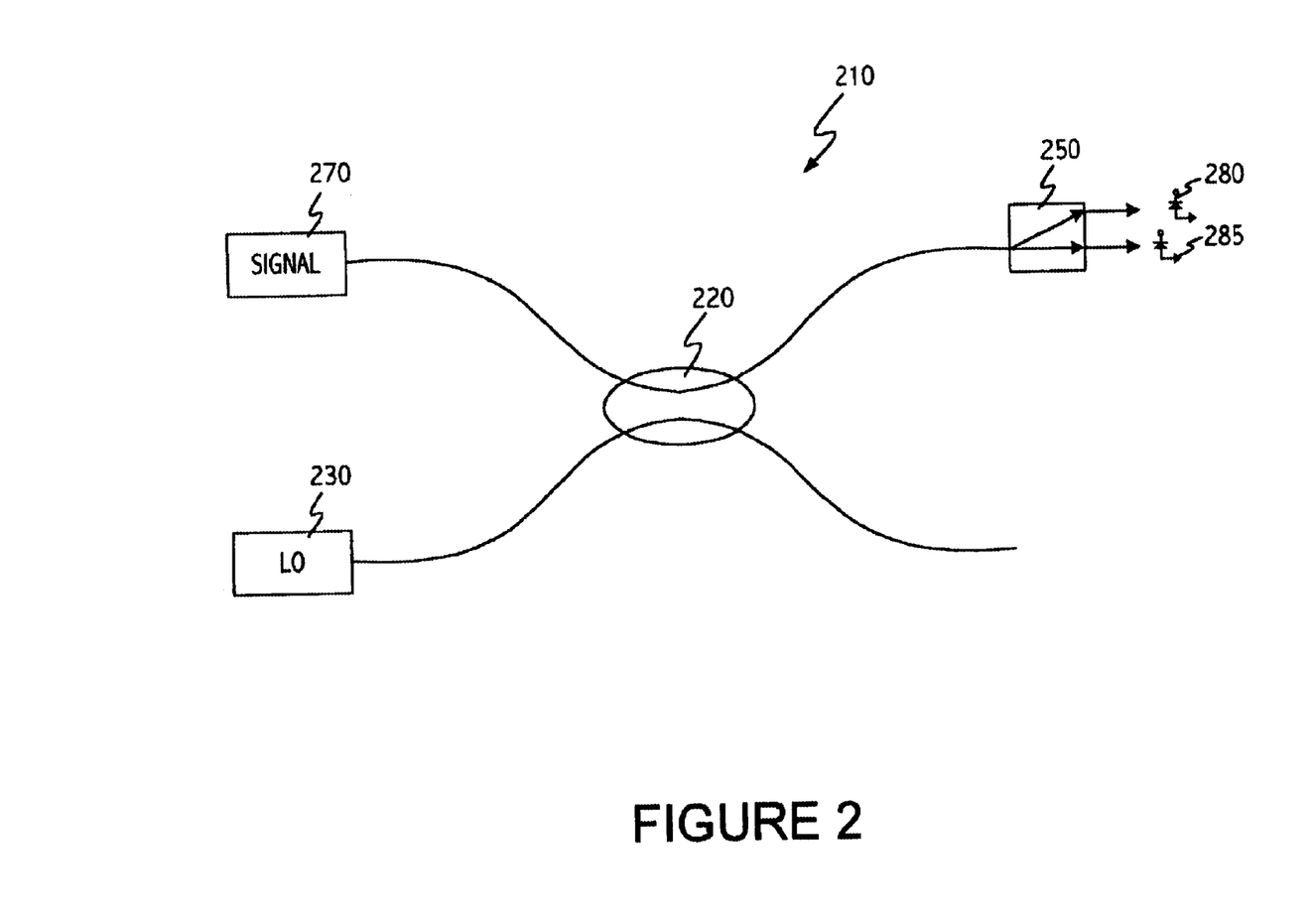
FIG. 2 shows a heterodyne polarimeter in accordance with the invention.

FIG. 2 shows a typical basic architecture for heterodyne polarimeter 210. It is assumed that coupler 220 does not alter the polarization state by taking the birefringence to be negligible. The polarization state of LO 230 is selected to provide substantially equal power at photodetectors 280 and 285. This corresponds to a set of polarization states defined by great circle 140 about the axis V-H of Poincare sphere 100 as shown in FIG. 1. Great circle 140 contains the 45° linear polarization state and circular polarization states R and L. Typically, LO 230 is swept such that its frequency $\omega(t)=\omega_o+2\pi\gamma t$ where $\gamma$ is the sweep rate. Hence the phase of LO 230, $\phi_o$, is found as $\phi_o=\int\omega(t)dt=\pi\gamma t^2+\omega_o t$. The LO amplitude is $a_0$ and the LO phase is $\xi_0$.

Typically, $\xi_0$ contains phase noise. Using the notation from Eq. (1), the electric field of LO 230 is given by:

$$E_0 = a_0 \exp(i\pi\gamma t^2 + i\omega_0 t + \xi_0)\frac{1}{\sqrt{2}}\begin{pmatrix} 1 \\ e^{i\psi_0} \end{pmatrix} \quad (3)$$

For signal 270 whose polarization state is taken to be arbitrary:

$$E_s = a_s \exp(i\omega_s t + \xi_s)\begin{pmatrix} \cos\alpha_s \\ e^{i\psi_s}\sin\alpha_s \end{pmatrix} \quad (4)$$

where $a_s$ is the amplitude of signal 270, $\omega_s$ is the frequency of signal 270 and $\xi_0$ is the phase of signal 270 including the phase noise contribution. The polarization state of signal 270 is determined by the angles $\alpha_s$ and $\psi_s$. The orthogonal linear components of the combined signal and LO 230 are detected individually after passing through polarizing beam splitter 250 (see FIG. 2):

$$E_{H,V}=P_{H,V}(E_o+E_s), \quad (5)$$

where $$P_H = \begin{pmatrix} 1 & 0 \\ 0 & 0 \end{pmatrix} \text{ and } P_V = \begin{pmatrix} 0 & 0 \\ 0 & 1 \end{pmatrix}$$

are Jones matrices for the horizontal and vertical linear polarizers realized by polarizing beam splitter 250, respectively. The splitting ratio and phase shift due to optical coupler 320 are omitted for clarity. The intensity at photodiodes 380 and 385 is given by $$I_{H,V} = E_{H,V}^T \cdot E_{H,V}^*,$$

respectively. For a typical Gaussian low-pass receiver, the heterodyne beat signals corresponding to the detected horizontal and vertical polarization states are given by:

$$i_H=\alpha_o\alpha_s \cos\alpha_s \cos(\pi\gamma t^2+\xi_o-\xi_s)\exp(-t^2/\tau^2) \quad (6)$$

and $$i_V=\alpha_o\alpha_s \sin\alpha_s \cos(\pi\gamma t^2+\xi_o-\xi_s+\psi_o-\psi_s)\exp(-t^2/\tau^2), \quad (7)$$

where $\tau$ represents the time required to sweep the 1/e half-bandwidth of the Gaussian low-pass receiver at the sweep rate $\gamma$.

To simplify the mathematical notation, it is assumed that that the responsivity of photodiodes 280 and 285 is unity and at t=0 the frequencies $\omega_o$ and $\omega_s$ are equal, hence $\omega_s=\omega_o$. Eqs. (6) and (7) are oscillatory functions whose amplitudes and phases are related by the angles $\alpha_s$ and $\psi_s$ that describe the polarization state of signal 270. The relative amplitudes of Eqs. (6) and (7) determine the angle $\alpha_s$ because tan $\alpha_s=|i_V|/|i_H|$ and the phase difference between Eqs. (6) and (7) determines the angle $\psi_s$ with respect to $\psi_o$ because $\psi_s-\psi_o=$ arg$(i_V)$−arg$(i_H)$ where arg is defined to be the argument of the cosine function. Because the polarization state is determined with reference to the polarization state of LO 230 which is assumed to be constant during the measurement procedure, it is convenient to introduce the angle $\psi'_s=\psi_s-\psi_o$. The phase noise of LO 230 and signal 270 is represented by the term $\xi_o-\xi_s$ which appears in the cosine arguments of Eqs. (6) and (7) and cancels when the phase difference between signals $i_H$ and $i_V$ is considered. Measurement of the relative amplitude and phase difference of the signals $i_H$ and $i_V$ determines the parameters $\alpha_s$, $\psi$ and thereby the relative polarization state:

$$P_{s-o} = \begin{pmatrix} \cos\alpha_s \\ e^{i\psi_s}\sin\alpha_s \end{pmatrix} \quad (8)$$

Power from LO 230 is taken to be split equally between the two detected polarization states to simplify the analysis.

Figure 3:
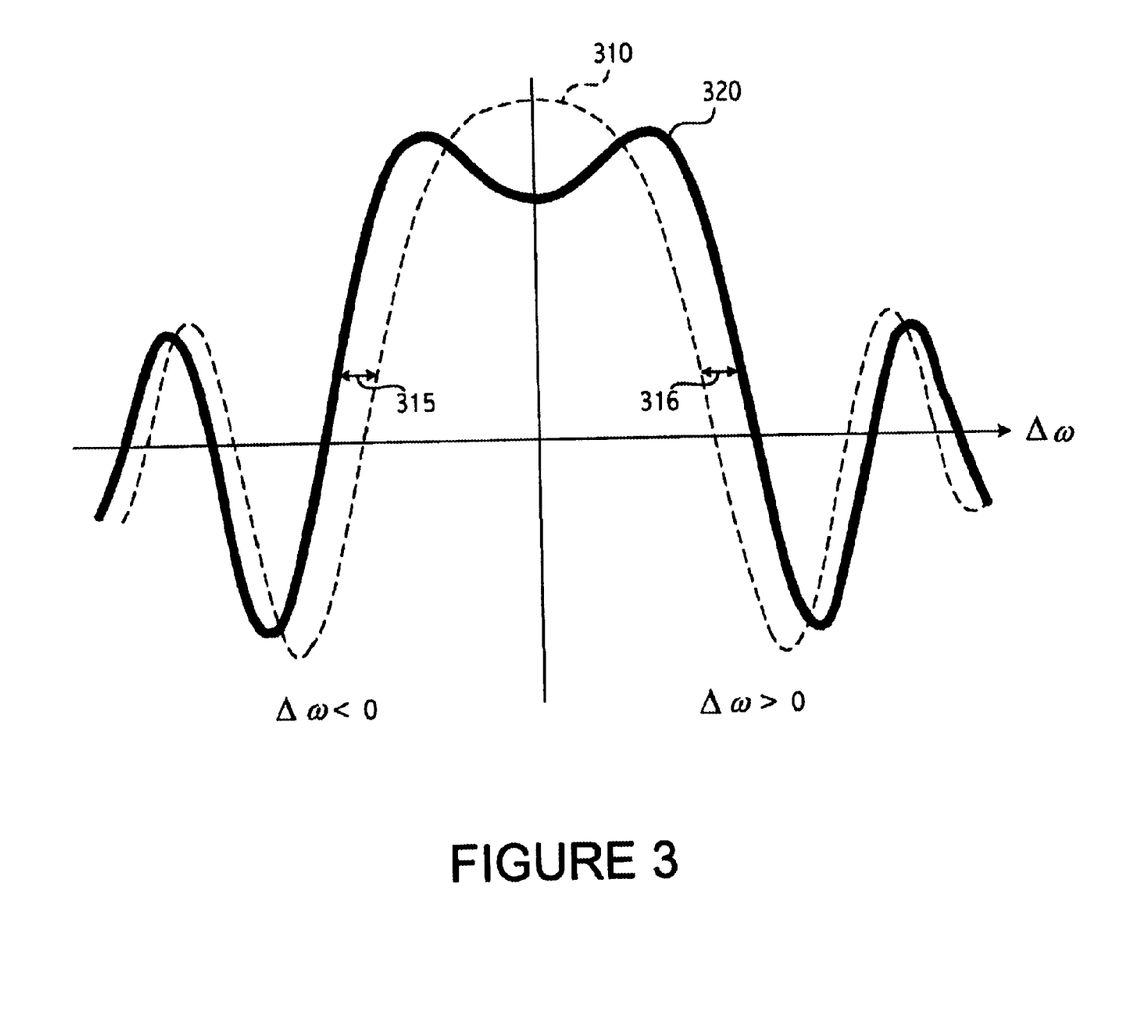
FIG. 3 illustrates the apparent phase flip between the two hemispheres of the Poincare sphere.
Figure 4:
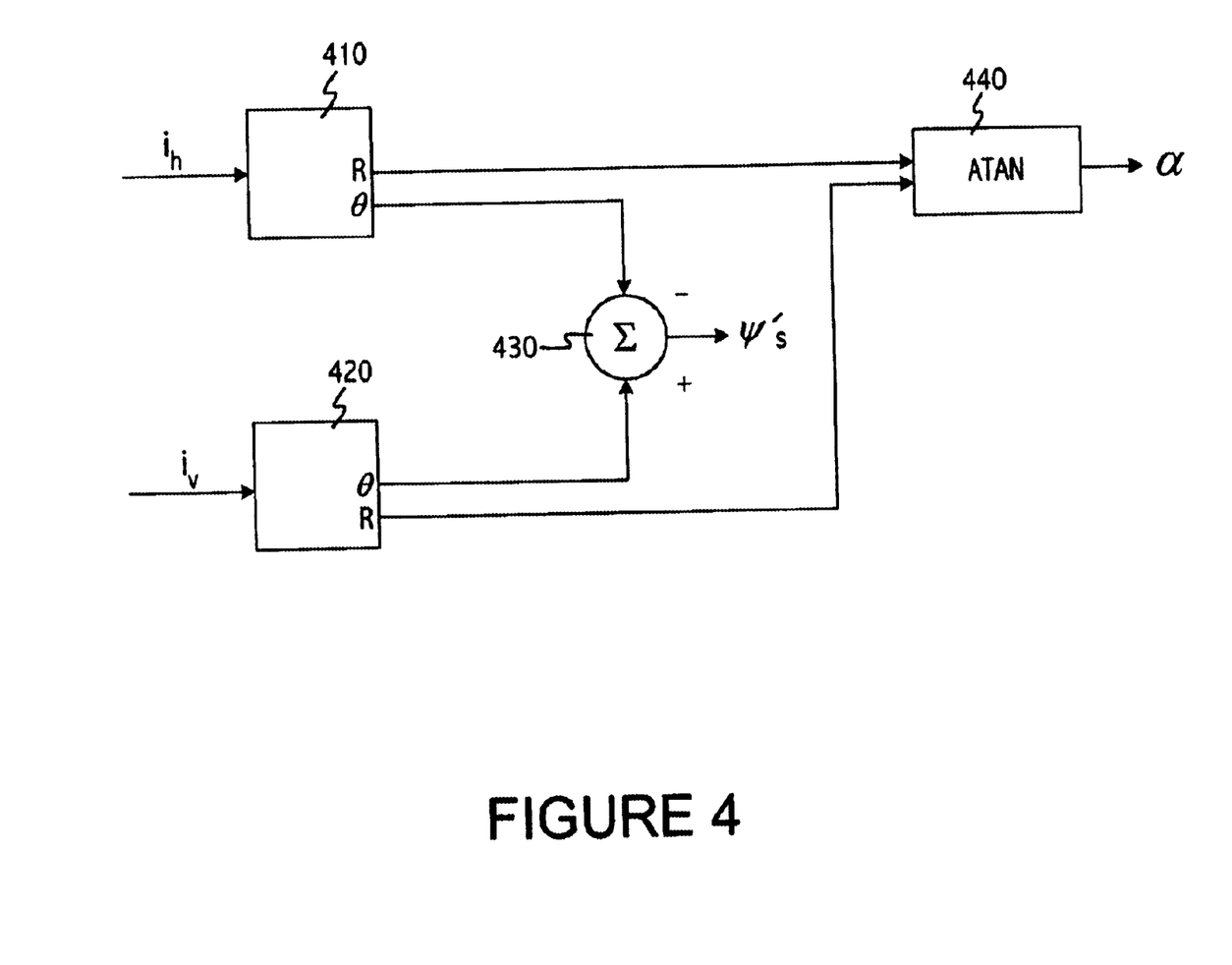
FIG. 4 shows the use of orthogonal filters to determine the inphase (I) and quadrature (Q) components in accordance with an embodiment of the invention.

Typically, amplitude and phase may be recovered from the oscillatory signals using orthogonal filters. Note that the heterodyne beat frequency changes quadratically with time as shown in FIG. 3. FIG. 4 shows the use of orthogonal filters 410 and 420 to determine the in-phase (I) and quadrature (Q) components and therefore, the amplitude (R) and phase (Θ) of the signals $i_H$ and $i_V$, respectively, for heterodyne polarimeter 210. The recovered phase from $i_H$ is inverted and added to the recovered phase from $i_V$ by summation module 430 to calculate the phase difference, $\psi'_s$. The recovered amplitudes from $i_H$ and $i_V$ are then processed to obtain the angle $\alpha$ from arctangent module 440. Orthogonal filters 410, 420 and modules 430, 440 in FIG. 4 are typically incorporated into a signal processor unit, such as processor 690 in FIG. 6a.

Figure 5:
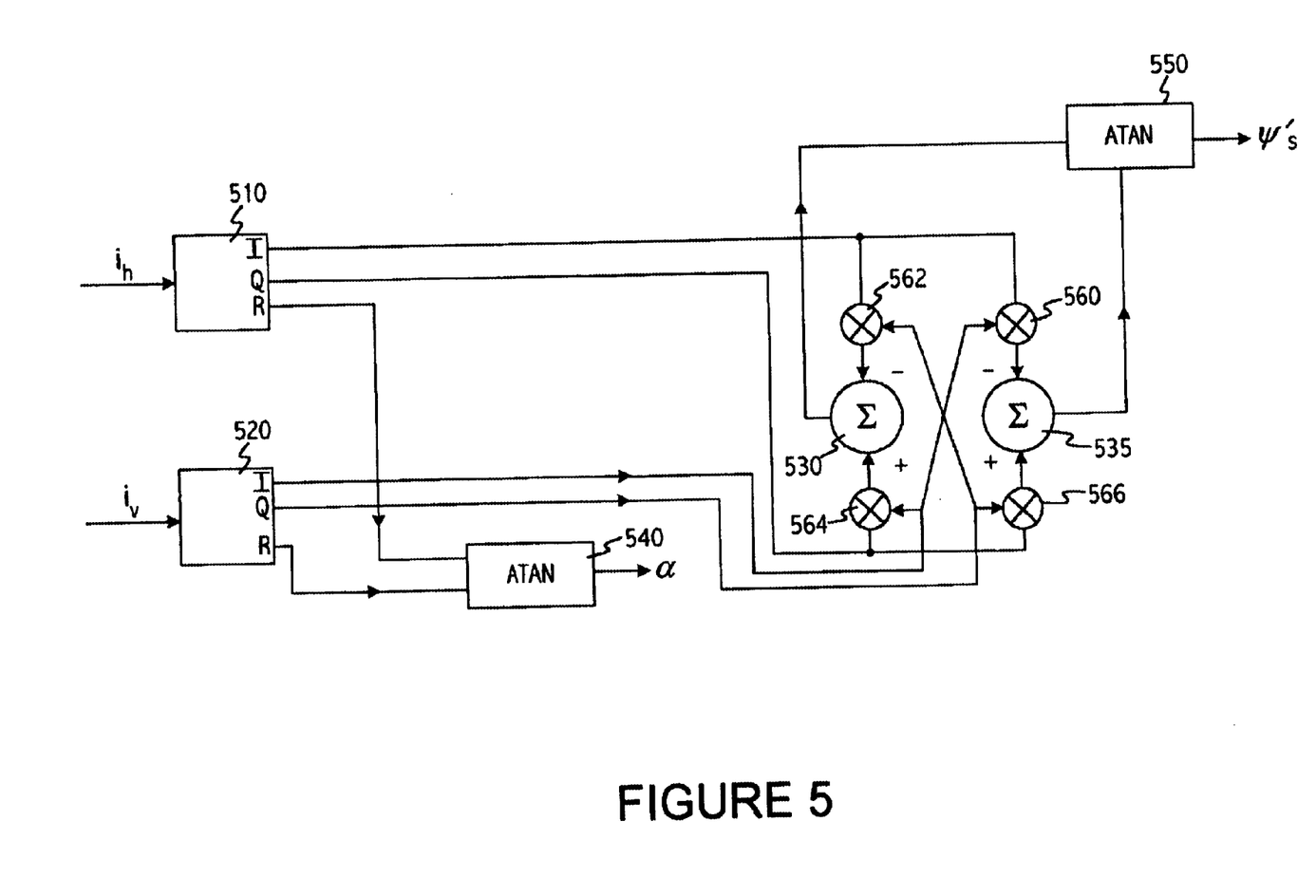
FIG. 5 shows an embodiment in accordance with the invention for determining the phase difference.

FIG. 5 shows an embodiment in accordance with the invention for determining the phase difference, $\psi'_s$ which is typically more robust than that shown in FIG. 4. Angle α is determined as in FIG. 4 using arctangent module 540. The phase difference, $\psi'_s$, in FIG. 5 is determined from the in-phase and quadrature components of $i_H$ and $i_V$ which are obtained using quadrature filters 510 and 520, respectively. The in-phase component of the $i_H$ heterodyne beat signal is multiplied by the quadrature component of the $i_V$ heterodyne beat signal in multiplier module 562 and inverted. The quadrature component of the $i_H$ heterodyne beat signal is multiplied by the in-phase component of the iv heterodyne beat signal in multiplier module 564. The two signals are then combined in summation module 530 to yield sin $\psi'_s$ which is input to arctangent module 550. The in-phase component of the $i_H$ heterodyne beat signal is multiplied by the in-phase component of the $i_V$ heterodyne beat signal in multiplier module 560. The quadrature component of the $i_H$ heterodyne beat signal is multiplied by the quadrature component of the $i_V$ heterodyne beat signal in multiplier module 566. The two signals are then combined in summation module 535 to yield cos $\psi'_s$ which is input to arctangent module 550. Arctangent module 550 outputs the phase difference, $\psi'_s$. Quadrature filters 510, 520 and modules 540, 550, 562, 560, 530, 535, 564, 566 are typically part of a signal processor unit such as processor 690 in FIG. 6a.

The quadratic phase behavior resulting from swept LO 230 in heterodyne receiver 210 creates a hemisphere uncertainty because of the apparent phase reversal that occurs when $\Delta\omega$, the frequency difference between swept LO 230 and signal 270, changes sign as the local oscillator frequency is swept past the signal frequency. For a band-pass receiver centered at the intermediate frequency (IF), $\omega_{IF}$, the heterodyne beat signal at that frequency appears when $\Delta\omega=\omega_o-\omega_s=\omega_{IF}$ and when $\Delta\omega=\omega_s-\omega_o=\omega_{IF}$ where $\omega_o$ is the LO optical frequency and $\omega_s$ is the signal optical frequency. This leads to two images that have opposite sign of the polarization phase $\psi'_s$. The analogous behavior exists for negative and positive frequencies in a low-pass receiver. This is shown in FIG. 3. FIG. 3 shows heterodyne beat signals 310 and 320, typically corresponding to the detected horizontal and vertical polarization states typically defined by a polarizing beam splitter. For $\Delta\omega<0$, beat signal 320 has phase lag 315 with respect to beat signal 310 while for $\Delta\omega>0$, beat signal 320 has phase lead 316 with respect to beat signal 310, indicating an apparent phase flip.

The apparent change in the sign of $\psi'_s$ corresponds to a jump from one hemisphere of Poincare sphere 100 to the other. If a polarization state measurement is performed on a signal source having a linewidth narrower than the receiver bandwidth the sign uncertainty may be avoided by examining only the left or right hand image. If a signal source has a linewidth wider than the receiver bandwidth, the measured signal continuously jumps between the left and the right image or the measured signal's spectral components forming the left image counteract the spectral components forming the right image. Hence, a measurement of the polarization state is typically only possible for polarization states on or near equator 125 of Poincare sphere 100. Several approaches may be used to overcome the problem of hemisphere uncertainty. Typically, implicit in the approaches to removing the hemisphere uncertainty is measuring the product of the $i_V$ heterodyne beat signal with the $i_H$ heterodyne beat signal since the product is invariant to changes in the sign of $\psi'_s$. This approach requires the introduction of a reference signal to allow determination of the phase, $\psi'_s$. In accordance with the invention, other non-linear operators besides the product $i_H i_V$ produce a similar result. For example, any operations yielding a product in the power series expansion: $f(xy)=f(0)+f'(0)xy+\frac{1}{2}f''(0)x^2y^2+\ldots$ where $f$ is a suitable function may be used.

Figure 6A:
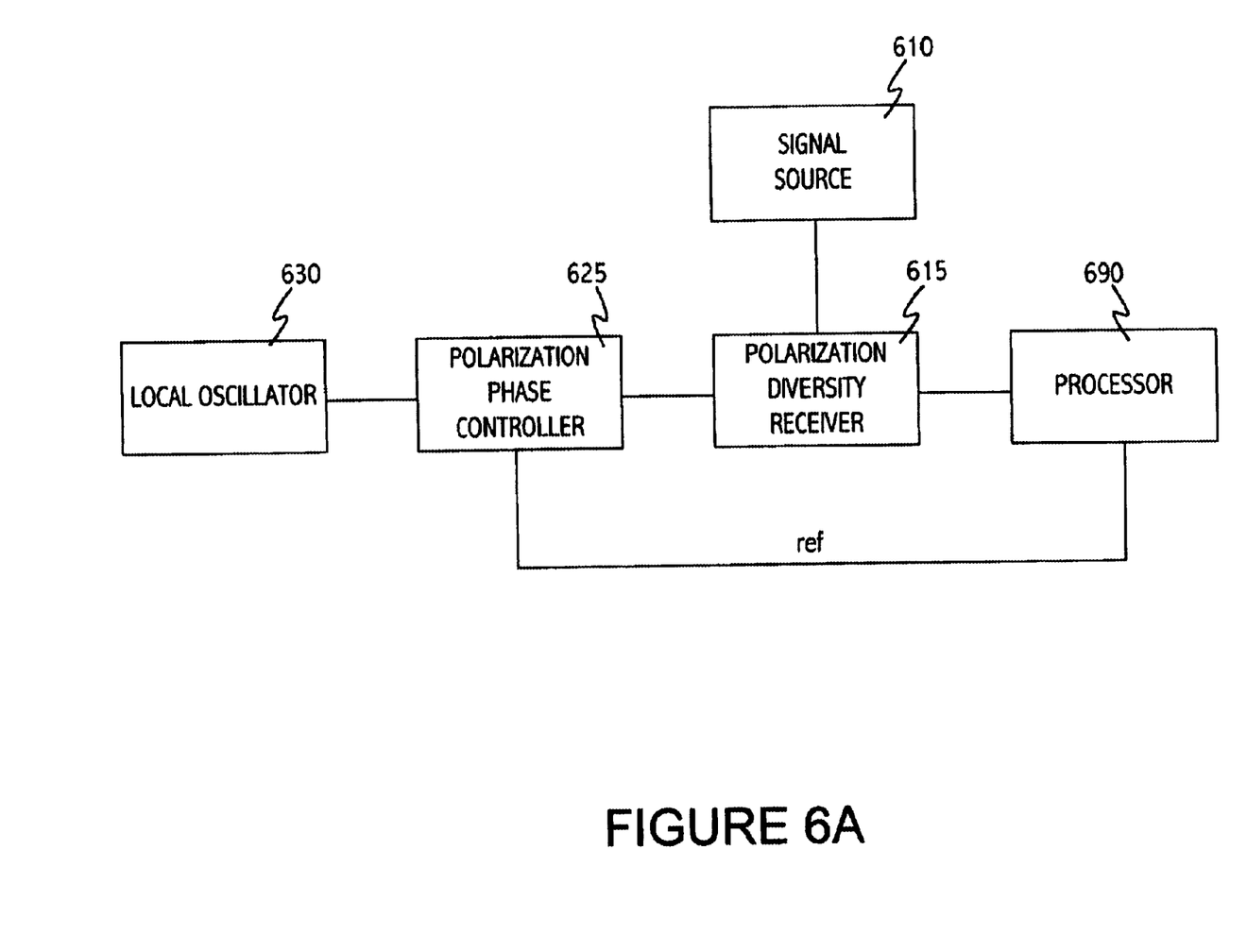
FIG. 6a shows a simplified block diagram of an embodiment in accordance with the invention.

FIG. 6a shows a simplified block diagram of an embodiment in accordance with the invention. Tunable LO block 630 is coupled to polarization phase controller block 625 which is coupled to polarization diversity receiver block 615. Signal source block 610 supplies the external optical signal to be measured and is also coupled to polarization diversity receiver block 615. Polarization diversity receiver block 615 combines the local oscillator signal with the external optical signal and detects two, typically, linearly orthogonal heterodyne components which are processed by processor 690 to determine the polarization of the external signal.

Figure 6B:
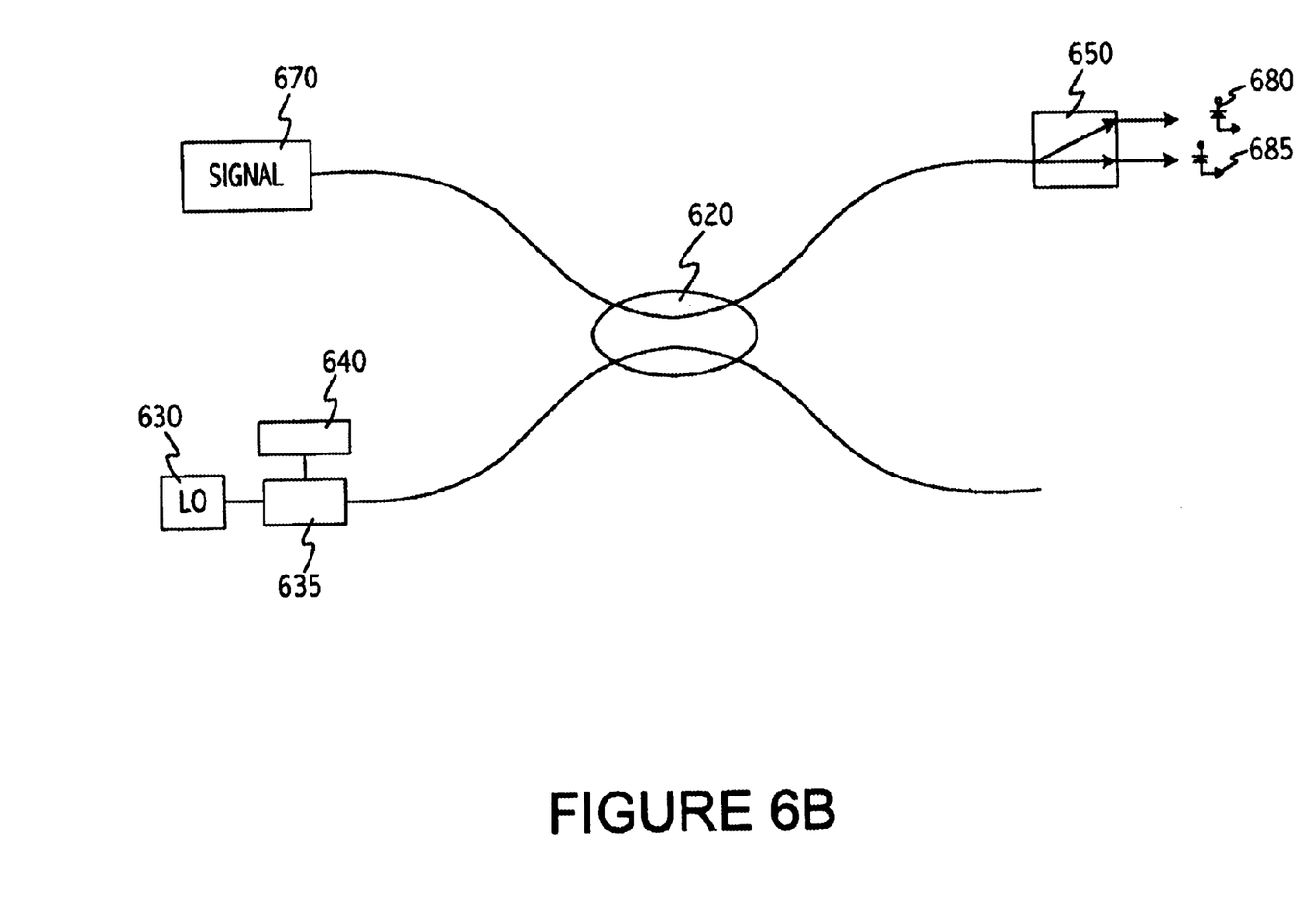
FIG. 6b shows an embodiment in accordance with the invention.

FIG. 6b shows an embodiment in accordance with the invention. The embodiment is similar to that shown in FIG. 2 but polarization phase controller 635 and modulation signal generator 640 have been added to provide polarization phase control and a reference signal for the signal analysis. Note that modulation signal generator 640 provides a reference signal to processor 690 (see FIG. 6a). The receiver is typically taken to be a band-pass receiver that rejects DC. The angle $\psi_0$ of the polarization state of LO 630 can be shifted by a known phase shift $\Delta\psi$ using polarization controller 635. The phase shift $\Delta\psi$ corresponds to moving by an angle $\Delta\psi$ on great circle 140 on Poincare sphere 100. Phase shifts may typically be induced into the signal coming from LO 630 by using Ti-indiffused LiNbO$_3$ phase modulator 635 oriented at 45° with respect to the linear polarization state of the signal from LO 630 or by any other means of changing $\psi$ such as a polarization controller. The phase shift $\Delta\psi$ is typically controlled by modulation voltage 640 applied to phase modulator 635. Optical coupler 620 combines signal 670 and the signal from LO 630. Photodiodes 680 and 685 detect the orthogonal linear components of the combined signal 670 and signal from LO 630 individually after passing through beam splitter 650. This results in electrical signals $i_H$ and $i_V$ which are then processed further by examining the hemisphere invariant product $i_H i_V$ as well as the individual signals $i_H$ and $i_V$.

Figure 7:
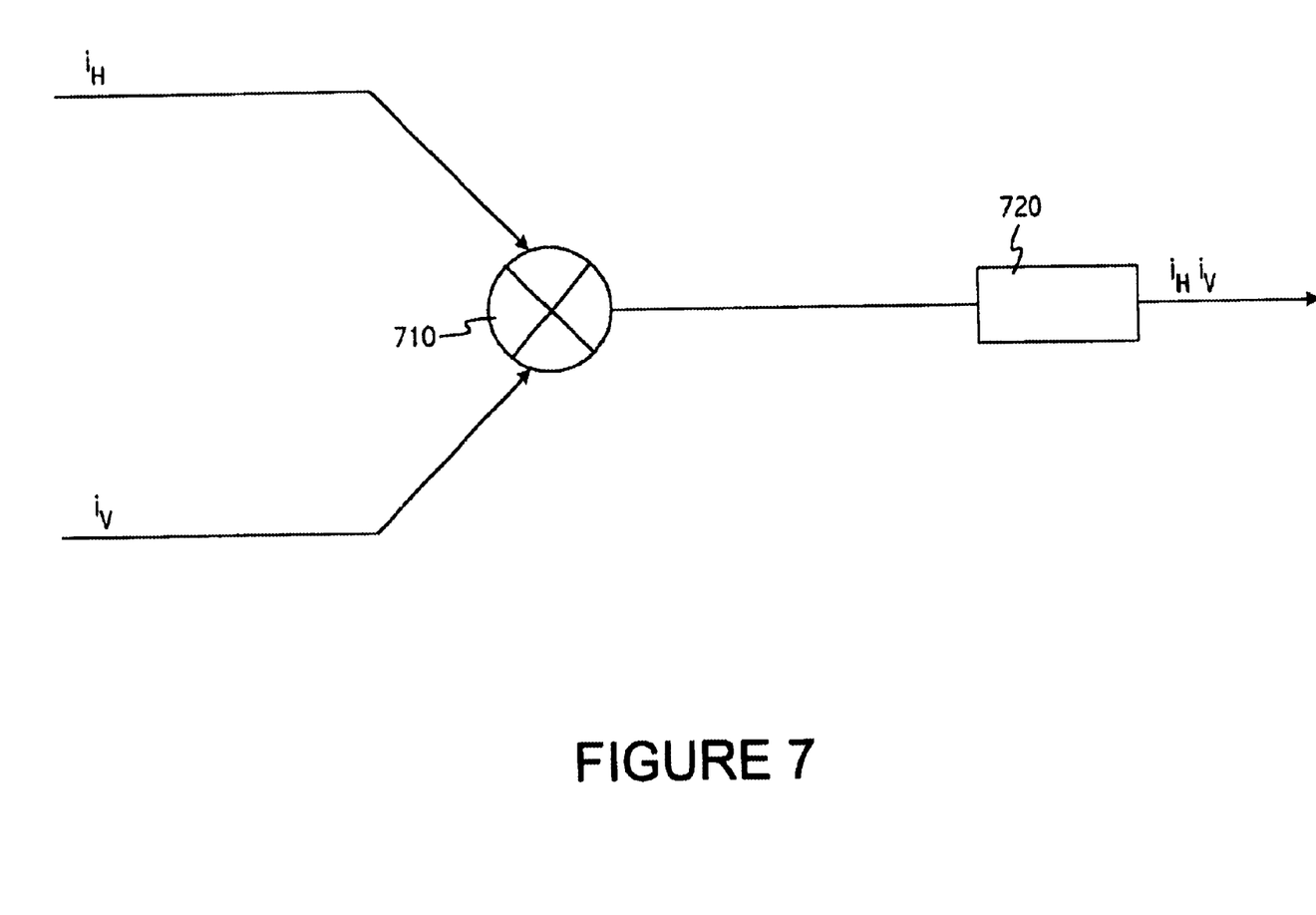
FIG. 7 shows a multiplier module and low pass filter in an embodiment in accordance with the invention.

In accordance with an embodiment of the invention, two separate measurements are performed using phase shifts $\pm\Delta\psi_0/2$, respectively. With reference to FIG. 7, signals $i_H$ and $i_V$ are first multiplied together in multiplier module 710 and then low-pass filtered by low-pass filter 720. Because signals $i_H$ and $i_V$ are both at the same frequency, the multiplication of the two signals results in a DC term that is measured and an AC term that is rejected by low-pass filter 720. Module 710 and low-pass filter 720 are typically implemented in a signal processor, such as processor 690 in FIG. 6.

Multiplication of signal $i_H$ by signal $i_V$ yields a DC and an AC term. Note that the product, $i_H i_V$, is hemisphere invariant and removes the hemisphere uncertainty discussed above. Considering the DC term for a phase shift of $\Delta\psi_0/2$ gives:

$$p_1 = A \cos(\psi'_s + \Delta\psi_0/2) \tag{9}$$

where $A$ is typically a time varying amplitude. Considering the DC term for a phase shift of $-\Delta\psi_0/2$ gives:

$$P_2 = A \cos(\psi'_s - \Delta\psi_0/2) \tag{10}$$

Eqs. (9) and (10) may be used to determine $\psi'_s$:

$$\tan(\psi'_s)\tan(\Delta\psi_0/2) = \frac{p_2 - p_1}{p_1 + p_2} \tag{11}$$

which simplifies to:

$$\tan(\psi'_s) = \frac{p_2 - p_1}{p_1 + p_2} \tag{12}$$

when $\Delta\psi_0=\pi/2$. The introduction of reference angles $\pm\Delta\psi_0/2$ using Ti-indiffused LiNbO$_3$ phase modulator 635 allows recovery of the phase $\psi'_s$. In this embodiment, the reference signal is simply the phase shift, $\Delta\psi$.

Figure 8:
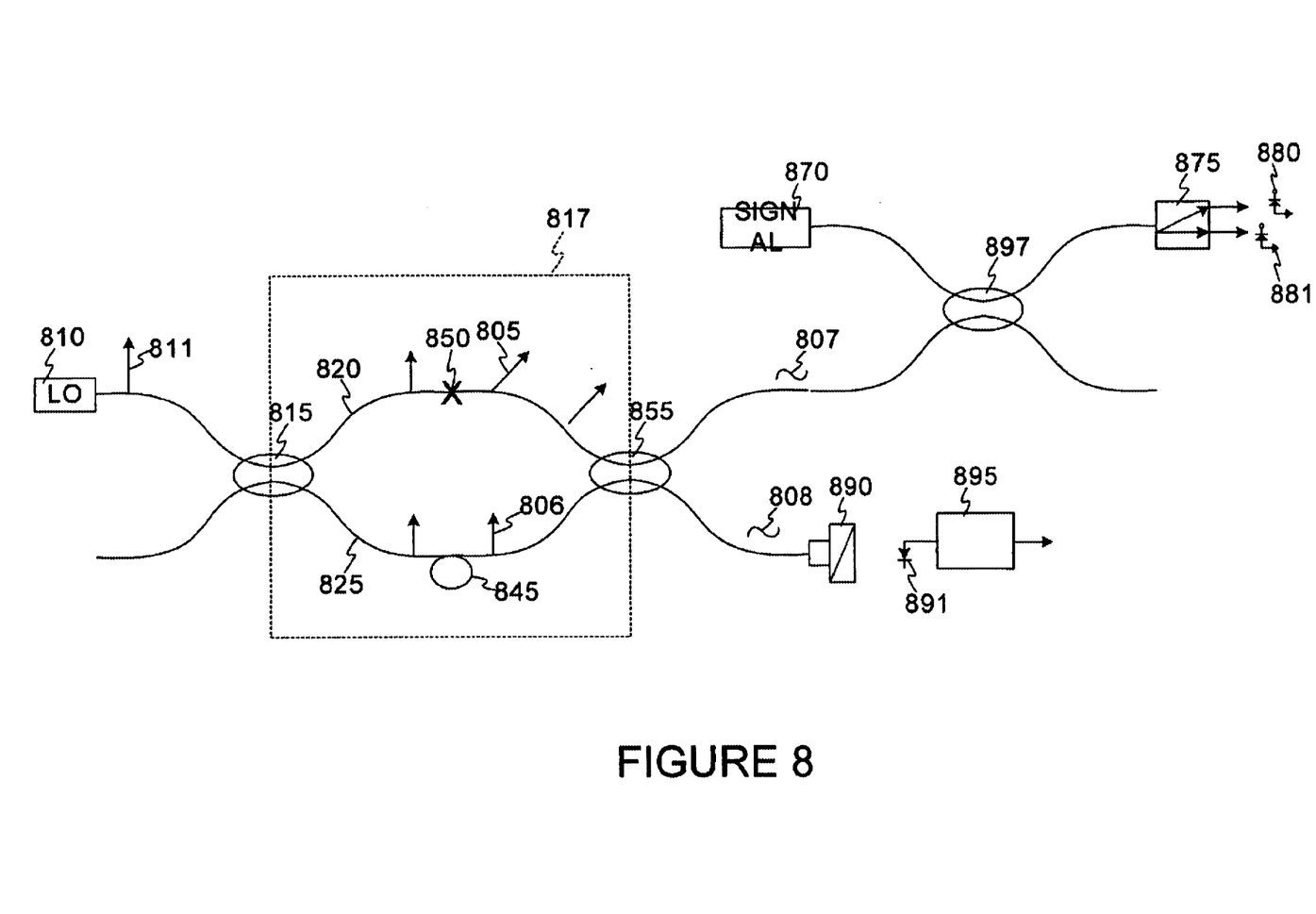
FIG. 8 shows an embodiment in accordance with the invention which involves spinning the polarization state by using polarization maintaining fiber interferometer.

In accordance with an embodiment of the invention, the hemisphere uncertainty may be removed by using a swept local oscillator (LO) to provide a signal comprising two optical frequencies separated by $\Delta\omega$ and having orthogonal linear polarization states. FIG. 8 shows an embodiment in accordance with the invention which involves spinning the polarization state by using polarization maintaining fiber interferometer 817 to provide polarization phase control and a reference signal. LO 810 outputs frequency swept linearly polarized optical signal 811 and is aligned with and coupled to polarization maintaining optical fibers 820 and 825 by optical coupler 815. Splice 850 is typically a 90° splice in polarization maintaining fiber 820. Arm imbalance 845 introduces delay $\tau_d$ which results in a frequency shift, $\Delta\omega = -2\pi\gamma\tau_d$, in LO signal 805 in polarization maintaining fiber 825. When LO optical signals 805 and 806 enter optical combiner 855, LO signals 805 and 806 are in orthogonal linear polarization states and are shifted in frequency by $\Delta\omega$ with respect to each other as described by Eq. (13). Hence, LO signal 807 has two linear polarization states. In Jones vector notation, this gives for the electric field of LO signal 807 in FIG. 8:

$$E_0 = a_0 \exp(i\pi\gamma t^2 + i\omega_0 t + \xi_0) \frac{1}{\sqrt{2}} \begin{pmatrix} 1 \\ e^{i\psi_0 + \Delta\omega t} \end{pmatrix} \quad (13)$$

where $\Delta\omega$ is the optical frequency shift, $\psi_0 = \pi\gamma\tau_d^2 - \omega_0\tau_d + \phi_1$ where $\phi_1$ is the phase difference between optical fibers 820 and 825 and the remaining variables are as defined above.

Optical LO signal 807 is pseudo-depolarized. This means that the polarization state of LO signal 807 spins about Poincare sphere 100 on great circle 140 at a frequency of $\Delta\omega$. Optical coupler 897 combines signal 870 with combined LO signal 807. The two linearly polarized components of combined LO signal 807 are aligned with polarizing beam splitter 875 so that the polarized components are separated by polarizing beam splitter 875 and separately detected by detectors 880 and 881. Hence, detector 880 typically detects the LO component that is frequency shifted $\Delta\omega$ from the LO component detected by detector 881.

Taking Eq. (13) describing the LO electric field $E_0$, together with Eq. (4) describing the electric field $E_s$ of signal 870, equations analogous to Eqs. (6) and (7) may be derived using the procedure described above:

$$i_H = 2a_0 a_s \cos(\alpha_s)\cos(\pi\gamma t^2 + \xi_0 - \xi_s)\exp(-t^2/\tau^2/\tau^2) \quad (14)$$

$$i_V = 2a_0 \alpha_s \sin(\alpha_s)\cos(\pi\gamma t^2 + \Delta\omega t + \xi_0 - \xi_s + \psi_0 - \psi_s)\exp(-t^2/\tau^2). \quad (15)$$

Therefore, using Eqs. (14) and (15) the low-pass-filtered hemisphere independent product $i_H i_V$ is given by:

$$p = A \cos(\psi'_s + \Delta\omega t). \quad (16)$$

The low-pass-filtered product p in Eq. (16) may typically be found as shown in FIG. 7. The product $i_H i_V$ of Eq. (16) represents an oscillatory function with a frequency of $\Delta\omega$ and a phase shift of $\psi'_s$. Polarization modulated LO signal 808 also passes through 45° polarizer 890 and is detected by detector 891 which converts optical signal 808 to an electrical signal that is typically low-pass-filtered by low-pass filter 895 to output a reference signal ref proportional to $\cos(\Delta\omega t + \psi_0)$. Derivation of a $\cos(\Delta\omega t + \psi_0)$ reference signal, ref, from LO signal 808 using interferometer 817 allows the phase shift $\psi_s$ ($\psi'_s = \psi_0 - \psi_s$) to be determined, for example, using the phase sensitive detection techniques shown in FIG. 9 or FIG. 10. Low-pass filter 895 is typically implemented in a signal processing unit such as processor 690 in FIG. 6a.

Figure 9:
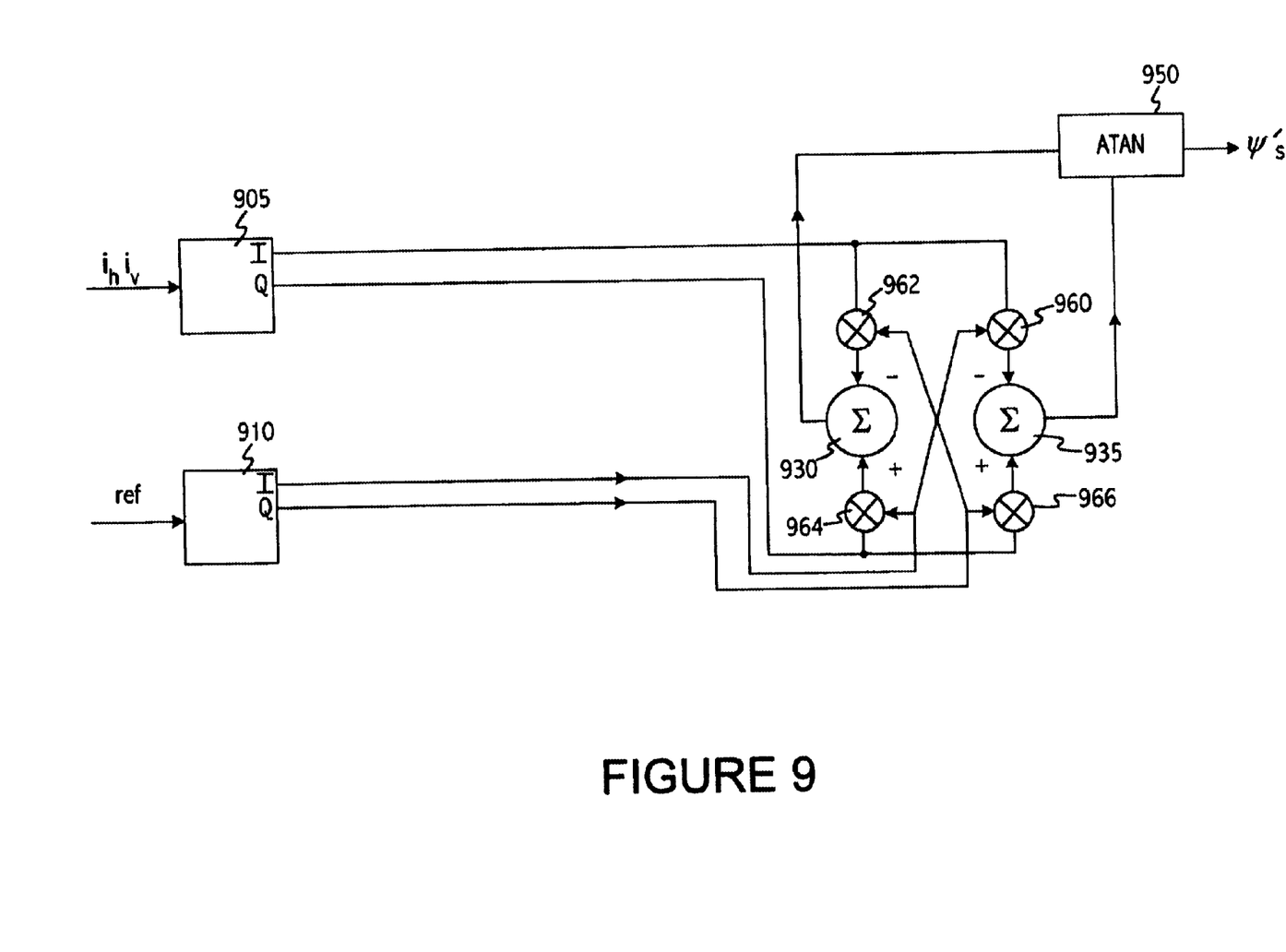
FIG. 9 shows an embodiment in accordance with the invention for determining the phase difference using the in-phase and quadrature components of $i_H i_V$ and the reference signal.

With reference to FIG. 9, the phase difference, $\psi_s$, is determined from the in-phase and quadrature components of $i_H i_V$ and the reference signal, ref, from quadrature filters 905 and 910, respectively. The in-phase component of the $i_H i_V$ heterodyne beat signal is multiplied by the quadrature component of the reference signal in multiplier module 962 and inverted. The quadrature component of the $i_H i_V$ heterodyne beat signal is multiplied by the in-phase component of the reference signal in multiplier module 964. The two signals are then combined in summation module 930 to give $\sin(\psi_s)$ and input to arctangent module 950. The in-phase component of the $i_H i_V$ heterodyne beat signal is multiplied by the in-phase component of the reference signal in multiplier module 960. The quadrature component of the $i_H i_V$ heterodyne beat signal is multiplied by the quadrature component of the reference signal in multiplier module 966. The two signals are then combined in summation module 935 to give $\cos(\psi_s)$ and also input to arctangent module 950. Arctangent module 950 outputs the angle for signal 870, $\psi_s$. Quadrature filters 905, 910 and modules 962, 960, 930, 935, 964, 966, 950 are typically implemented in a signal processing unit, such as processor 690 in FIG. 6a.

Figure 10:
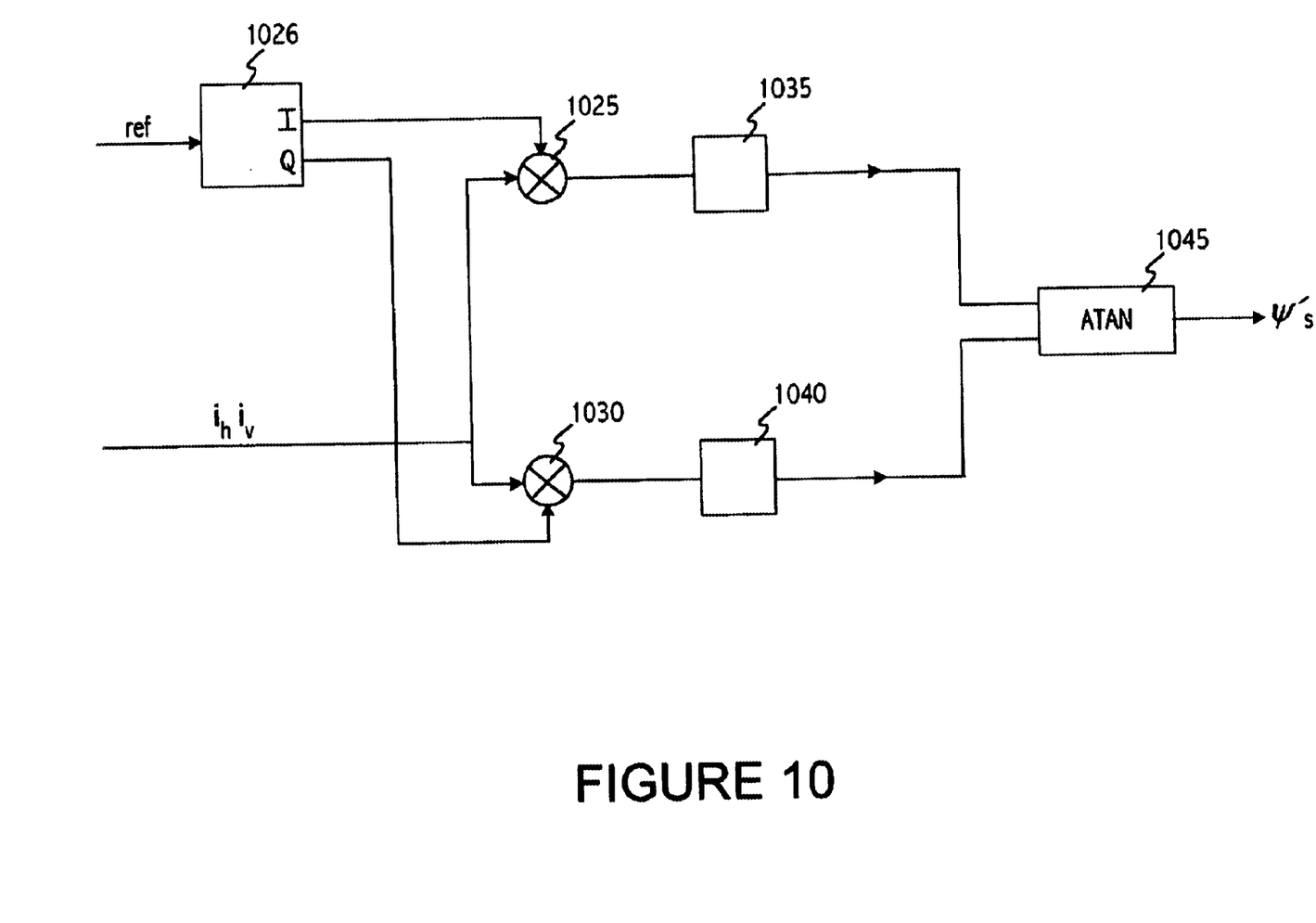
FIG. 10 shows an embodiment in accordance with the invention for determining the phase difference using $i_H i_V$ and the in-phase and quadrature components of the reference signal.

Alternatively, with reference to FIG. 10, the phase difference, $\psi_s$, may be determined using $i_H i_V$ and the in-phase and quadrature components of reference signal, ref from quadrature filter 1020. The in-phase component of reference signal, ref, is multiplied by $i_H i_V$ in multiplier module 1025 prior to low-pass filtering by low-pass filter 1035. The quadrature component of reference signal, ref, is multiplied by $i_H i_V$ in multiplier module 1030 prior to low-pass filtering by low-pass filter 1040. The outputs from filter modules 1035 and 1040 are the cosine and sine of $\psi_s$, respectively, which are input into arctangent module 1045 to recover the angle for signal 870, $\psi_s$. Quadrature filter 1020, modules 1025, 1030, 1045 and low-pass filters 1035 and 1040 are typically implemented in a signal processor such as processor 690 in FIG. 6a.

Figure 11A:
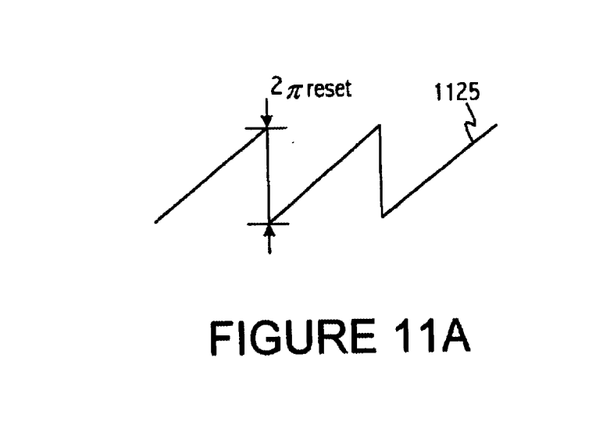
FIG. 11a shows a saw-tooth modulation signal with $2\pi$ phase resets in accordance with the invention.

Other embodiments in accordance with the invention are possible for spinning the polarization state besides the embodiment shown in FIG. 8. For example, the embodiment shown in FIG. 6b achieves depolarization using Ti-indiffused LiNbO$_3$ phase modulator 635. Modulation signal generator 640 in this embodiment may be set to saw-tooth modulation 1125 with $2\pi$ phase resets as shown in FIG. 11a, where phase refers to a phase difference between the transverse electric and transverse magnetic mode. The polarization spinning is discontinuous. The polarization state makes a complete rotation about Poincare sphere 100 on great circle 140 and resets to the starting position to repeat the rotation.

Figure 12:
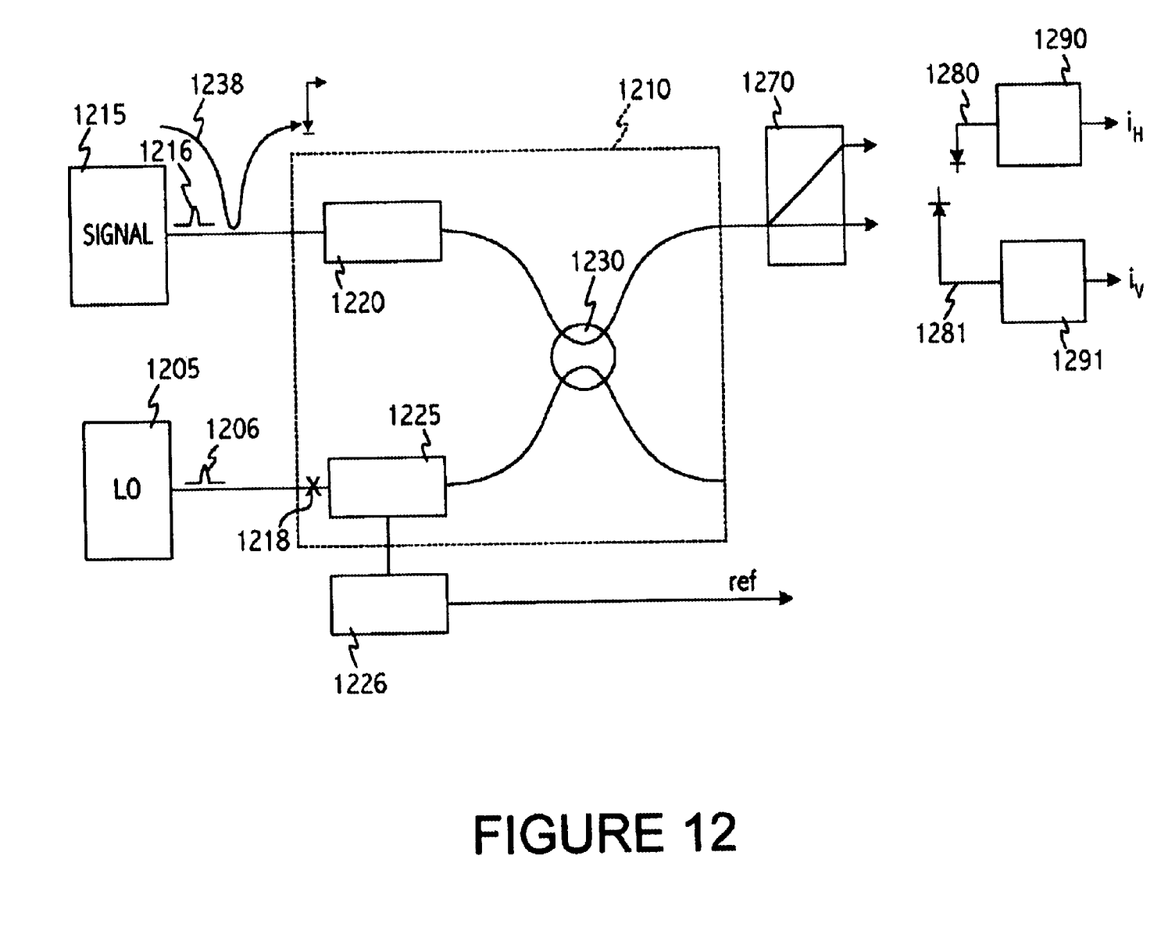
FIG. 12 shows an embodiment in accordance with the invention.

An embodiment in accordance with the invention is shown in FIG. 12. Ti-in-diffused LiNbO$_3$ phase modulator device 1210 functions to depolarize LO signal 1206 from LO 1205, combine signal 1216 and LO signal 1206 in optical combiner 1230 and, if desired, modulate signal 1216 in optional signal phase modulation unit 1220. Note that Ti-indiffused LiNbO$_3$ phase modulator 1225 is coupled to LO 1205 at junction 1218 so that the axes of birefringence of phase modulator 1225 are oriented at 45° with respect to the linear polarization state of LO 1205. The embodiment shown in FIG. 12 has an optional provision for intensity noise subtraction. The intensity noise monitor module 1238 typically allows for reduction of noise using Kalman filtering as disclosed in "Kalman Filter Intensity Noise Subtraction for Optical Heterodyne Receivers" by Szafraniec, attorney docket no. 10020440-1 and incorporated by reference.

Polarizing beam splitter 1270 is typically attached directly to Ti-in-diffused LiNbO$_3$ phase modulator device 1210 at 45° to equalize the power from LO 1205 at detectors 1280 and 1281. When the embodiment is used as a heterodyne optical spectrum analyzer, polarization diversity is provided both by depolarization of LO reference signal 1206 and through the use of polarizing beam splitter 1270 to provide dual polarization diversity. This is typically advantageous as single stage polarization diversity typically is only about 95% effective. Photodiodes 1280 and 1281 detect the two optical components $i_H$ and $i_V$, respectively, from polarizing beam splitter 1270. Preamplifiers 1290 and 1291 amplify the electrical signals from photodiodes 1280 and 1281, respectively. The parameter ψ which corresponds to the polarization phase is measured using the embodiment in accordance with the invention shown in FIG. 9 or FIG. 10. The reference signal, ref, is provided by modulation signal generator 1226 to processor 690 (see FIG. 6*a*).

Figure 11B:
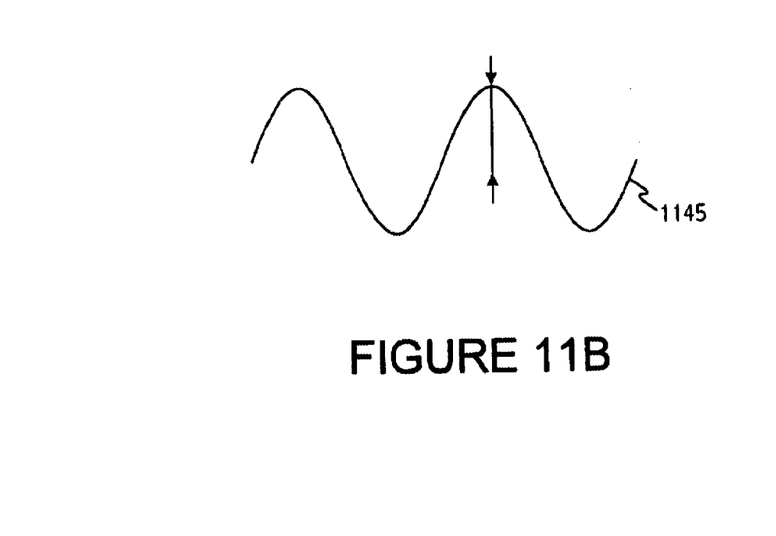
FIG. 11b shows a sinusoidal modulation signal in accordance with the invention.

With reference to FIG. 12 or FIG. 6*b*, sinusoidal modulation 1145 shown in FIG. 11*b* may be used in place of sawtooth modulation 1125 (see FIG. 11*a*) as the modulation waveform in an embodiment in accordance with the invention. Sinusoidal modulation 1145 causes the polarization state to move about the phase $\psi_0$ on great circle 140 of Poincare sphere 100. With sinusoidal modulation 1145, the low-pass filtered product $i_H i_V$ becomes:

$$p = A \cos(\psi'_s + \alpha \cos(\omega_m t)) \tag{17}$$

where a is the modulation depth and $\omega_m$ is the modulation frequency. The modulation depth, a, depends on the difference in the electro-optic coefficients that describe the change in refractive index of the TE and TM mode in response to the applied voltage to Ti-indiffused LiNbO$_3$ phase modulator unit 1225. Modulation depth, a, can be adjusted by changing the amplitude of the applied sinusoidal waveform so that LO 1205 is pseudo-depolarized. An appropriate series expansion of Eq. (17) gives:

$$\begin{aligned} p = {} & AJ_0(a)\cos(\psi'_s) - \\ & 2AJ_2(a)\cos(2\omega_m t)\cos(\psi'_s) + \\ & 2AJ_4(a)\cos(4\omega_m t)\cos(\psi'_s) - \\ & \vdots \\ & 2AJ_1(a)\cos(\omega_m t)\sin(\psi'_s) \\ & 2AJ_3(a)\cos(3\omega_m t)\sin(\psi'_s) - \\ & 2AJ_5(a)\cos(5\omega_m t)\sin(\psi'_s) \\ & \vdots \end{aligned} \tag{18}$$

In practice, the desired harmonics may typically be isolated by using a spectrum analyzer or a lock-in amplifier. A lock-in amplifier may be used to detect individual selected harmonics and their phase. Measurement of the odd or even harmonic in Eq. (18) for a known modulation depth, a, allows the phase $\psi'_s$ to be found. For example, by using the amplitude of the first harmonic, $h_1 = 2AJ_1(\alpha)\sin(\psi'_s)$ and the amplitude of the second harmonic, $h_2 = -2AJ_2(\alpha)\cos(\psi'_s)$, the angle, $\psi'_s$ may be recovered:

$$\tan(\psi'_s) = \frac{h_1 J_2(a)}{h_2 J_1(a)}. \tag{19}$$

If an electrical spectrum analyzer or Fourier analysis is used to determine $h_1$ and $h_2$, their values are always positive. Therefore, the angle $\psi'_s$ obtained from Eq. (19) will always be in the first quadrant while the angle's values range from $-\pi$ to $\pi$. Additional quadrant information is typically obtained by comparing the phase of the first and second harmonic signals, for example, with the phase of the reference signal at $\omega_m$ and the squared reference signal at $2\omega_m$ in the time domain.

It will be apparent to one skilled in the art that other modulation waveforms besides sinusoidal modulation waveforms can be used in the above embodiment. The only consequence of using a different modulation waveform is that a different harmonic content from that presented in Eq. (18) will be created.

While the invention has been described in conjunction with specific embodiments, it is evident to those skilled in the art that many alternatives, modifications, and variations will be apparent in light of the foregoing description. Accordingly, the invention is intended to embrace all other such alternatives, modifications, and variations that fall within the spirit and scope of the appended claims.

I claim:

1. An optical heterodyne polarimeter for determining the polarization of an optical signal, said optical heterodyne polarimeter comprising:
   a tunable laser source for outputting a swept local oscillator signal;
   a polarization phase controller optically coupled to said tunable laser source to generate a polarization phase shifted swept local oscillator signal from said swept local oscillator signal;
   an optical coupler configured to receive said polarization phase shifted swept local oscillator signal and said optical signal and output a combined signal;
   a polarization diversity receiver optically coupled to said optical coupler to receive said combined signal, said polarization diversity receiver configured to output a first and a second linear polarization component of said combined signal;
   a processor configured to determine the polarization of said optical signal from said first and said second linear polarization components.

2. The optical heterodyne polarimeter of claim 1 wherein said polarization phase controller comprises a Ti-indiffused LiNbO$_3$ phase modulator.

3. The optical heterodyne polarimeter of claim 1 wherein said polarization phase controller generates a shift of 90 degrees.

4. The optical heterodyne polarimeter of claim 2 wherein said Ti-indiffused LiNbO$_3$ phase modulator is oriented at 45 degrees with respect to the linear polarization state of said swept local oscillator signal.

5. The optical heterodyne polarimeter of claim 2 wherein said Ti-indiffused LiNbO$_3$ phase modulator is modulated by a sawtooth waveform.

6. The optical heterodyne polarimeter of claim 2 wherein said Ti-indiffused LiNbO$_3$ phase modulator is modulated by a sinusoidal waveform.

7. The optical heterodyne polarimeter of claim 1 wherein said polarization diversity receiver comprises a polarizing beam splitter.

8. The optical heterodyne polarimeter of claim 1 wherein said polarization phase controller comprises an interferometer for introducing a change of polarization state.

9. The optical heterodyne polarimeter of claim 1 wherein said swept local oscillator signal is pseudo-depolarized.

10. The optical heterodyne polarimeter of claim 1 wherein said processor comprises a quadrature filter.

11. An optical heterodyne polarimeter for determining the polarization of an optical signal, said optical heterodyne polarimeter comprising:
    a local oscillator for outputting a local oscillator signal;
    a polarization phase controller coupled to said local oscillator to modify the polarization state of said local oscillator signal and output a modified local oscillator signal;

a polarization diversity receiver coupled to said polarization phase controller, said polarization diversity receiver having an input to receive said optical signal; and a processor coupled to said polarization diversity receiver, said processor configured to determine the polarization state of said optical signal.

12. The optical heterodyne polarimeter of claim 11 wherein said local oscillator comprises a tunable laser source.

13. The optical heterodyne polarimeter of claim 12 wherein said tunable laser source generates a swept signal.

14. The optical heterodyne polarimeter of claim 13 wherein said swept signal is pseudo-depolarized.

15. The optical heterodyne polarimeter of claim 11 wherein said polarization phase controller comprises a phase modulator.

16. The optical heterodyne polarimeter of claim 15 wherein said phase modulator is modulated by a sinusoidal modulation signal.

17. The optical heterodyne polarimeter of claim 11 wherein said optical signal is phase modulated.

18. The optical heterodyne polarimeter of claim 11 wherein said polarization phase controller comprises an interferometer.

19. The optical heterodyne polarimeter of claim 11 wherein said optical signal is sampled to enable intensity noise subtraction.

20. A method for making an optical heterodyne polarimeter for determining the polarization of an optical signal comprising:

providing a local oscillator for outputting a local oscillator signal;

providing a polarization phase controller coupled to said local oscillator to modify the polarization state of said local oscillator signal and output a modified local oscillator signal;

providing a polarization diversity receiver coupled to said polarization phase controller, said polarization diversity receiver having an input to receive said optical signal; and providing a processor coupled to said polarization diversity receiver, said processor configured to determine the polarization state of said optical signal.

* * * * *